US012350846B2

(12) United States Patent
Onuma

(10) Patent No.: US 12,350,846 B2
(45) Date of Patent: Jul. 8, 2025

(54) ROBOT SYSTEM, METHOD FOR CONTROLLING ROBOT SYSTEM, AND PROGRAM

(71) Applicant: TOYOTA JIDOSHA KABUSHIKI KAISHA, Toyota (JP)

(72) Inventor: Yuji Onuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 927 days.

(21) Appl. No.: 17/505,094

(22) Filed: Oct. 19, 2021

(65) Prior Publication Data

US 2022/0118625 A1 Apr. 21, 2022

(30) Foreign Application Priority Data

Oct. 21, 2020 (JP) ................................. 2020-176509

(51) Int. Cl.
*B25J 9/16* (2006.01)
*B25J 13/00* (2006.01)
*B25J 11/00* (2006.01)

(52) U.S. Cl.
CPC .............. *B25J 9/1697* (2013.01); *B25J 9/161* (2013.01); *B25J 9/1664* (2013.01); *B25J 9/1689* (2013.01); *B25J 13/006* (2013.01); *B25J 11/0015* (2013.01)

(58) Field of Classification Search
CPC ........ B25J 9/1697; B25J 9/161; B25J 9/1664; B25J 9/1689; B25J 13/006; B25J 11/0015; B25J 5/007; B25J 11/0005; B25J 19/023; G05B 2219/40146; G05B 2219/40617

See application file for complete search history.

(56) References Cited

U.S. PATENT DOCUMENTS

| 10,878,960 B2* | 12/2020 | Wang .................... B25J 9/1689 |
| 11,816,887 B2* | 11/2023 | Pan ........................ G06N 20/00 |
| 2009/0118865 A1 | 5/2009 | Egawa et al. |
| 2021/0174080 A1 | 6/2021 | Nakagawa et al. |

FOREIGN PATENT DOCUMENTS

| JP | 2000-079587 A | | 3/2000 |
| JP | 2002-101333 A | | 4/2002 |
| JP | 2006211422 A | * | 8/2006 |
| JP | 4857242 B2 | | 1/2012 |
| JP | 2017-169170 A | | 9/2017 |
| JP | 2017-169839 A | | 9/2017 |

(Continued)

OTHER PUBLICATIONS

Machine translation of JP-2018039074-A.*

(Continued)

*Primary Examiner* — Robert T Nguyen
(74) *Attorney, Agent, or Firm* — Dinsmore & Shohl LLP

(57) ABSTRACT

A first exemplary aspect is a robot system includes: a robot configured to perform a predetermined operation; a first operation terminal configured to remotely operate the robot; and a second operation terminal configured to remotely operate the robot, the second operation terminal being provided separately from the first operation terminal. An operation capable of being performed by the second terminal to operate the robot is restricted as compared with that performed by the first operation terminal.

8 Claims, 7 Drawing Sheets

(56) References Cited

FOREIGN PATENT DOCUMENTS

| | | | | |
|---|---|---|---|---|
| JP | 2018039074 A | * | 3/2018 | |
| JP | 2019084898 A | * | 6/2019 | |
| JP | 6607111 B2 | * | 11/2019 | |
| WO | WO-2018193574 A1 | * | 10/2018 | ............... G05D 1/10 |
| WO | 2019/208537 A1 | | 10/2019 | |

OTHER PUBLICATIONS

Machine translation of WO-2018193574-A1.*
Machine translation of JP-2019-084898.*
Machine translation of JP-2006211422.*
Machine translation of JP-6607111-B2.*

* cited by examiner

# ROBOT SYSTEM, METHOD FOR CONTROLLING ROBOT SYSTEM, AND PROGRAM

CROSS REFERENCE TO RELATED APPLICATIONS

This application is based upon and claims the benefit of priority from Japanese patent application No. 2020-176509, filed on Oct. 21, 2020, the disclosure of which is incorporated herein in its entirety by reference.

BACKGROUND

The present disclosure relates to a robot system, a method for controlling the robot system, and a program.

With the development of a communication technology in recent years, it has become possible for an operator who is remotely operating a robot to have an experience which simulates the scenery surrounding the robot through the robot. Further, it has become possible for persons who are away from each other to communicate with each other in real time through a robot. For these reasons, various types of robot systems have been developed. Japanese Patent No. 4857242 discloses a technology regarding a robot including a camera mounted therein.

SUMMARY

As described above, a system enabling an operator to remotely operate a robot and, for example, have an experience which simulates the scenery surrounding the robot has been developed. In such a robot system, since an operator remotely operates the robot, it is necessary to ensure the safety on the robot side.

In view of the aforementioned problem, an object of the present disclosure is to provide a robot system, a method for controlling the robot system, and a program that are capable of ensuring safety when an operator remotely operates a robot.

A first exemplary aspect is a robot system including: a robot configured to perform a predetermined operation; a first operation terminal configured to remotely operate the robot; and a second operation terminal configured to remotely operate the robot, the second operation terminal being provided separately from the first operation terminal, in which an operation capable of being performed by the second terminal to operate the robot is restricted as compared with that performed by the first operation terminal.

Another exemplary aspect is a method for controlling a robot system, the robot system including: a robot configured to perform a predetermined operation; a first operation terminal configured to remotely operate the robot; and a second operation terminal configured to remotely operate the robot, the second operation terminal being provided separately from the first operation terminal, in which an operation capable of being performed using the second terminal to operate the robot is restricted as compared with that performed by the first operation terminal.

Another exemplary aspect is a program for causing a computer to execute processing for controlling a robot system, the robot system including: a robot configured to perform a predetermined operation; a first operation terminal configured to remotely operate the robot; and a second operation terminal configured to remotely operate the robot, the second operation terminal being provided separately from the first operation terminal, in which an operation capable of being performed using the second terminal to operate the robot is restricted as compared with that performed by the first operation terminal.

In the present disclosure described above, an operation capable of being performed by the second terminal to operate the robot is restricted as compared with that performed by the first operation terminal. That is, by restricting the operation capable of being performed by the second operation terminal to operate the robot, even if an operator of the second operation terminal erroneously operates the second operation terminal, the operation of the robot is restricted and thus the safety of the robot can be ensured. Therefore, it is possible to provide a robot system, a method for controlling the robot system, and a program that are capable of ensuring safety when an operator remotely operates the robot.

According to the present disclosure, it is possible to provide a robot system, a method for controlling the robot system, and a program that are capable of ensuring safety when an operator remotely operates a robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, an embodiment of the present disclosure will be described with reference to the drawings.

Figure 1:
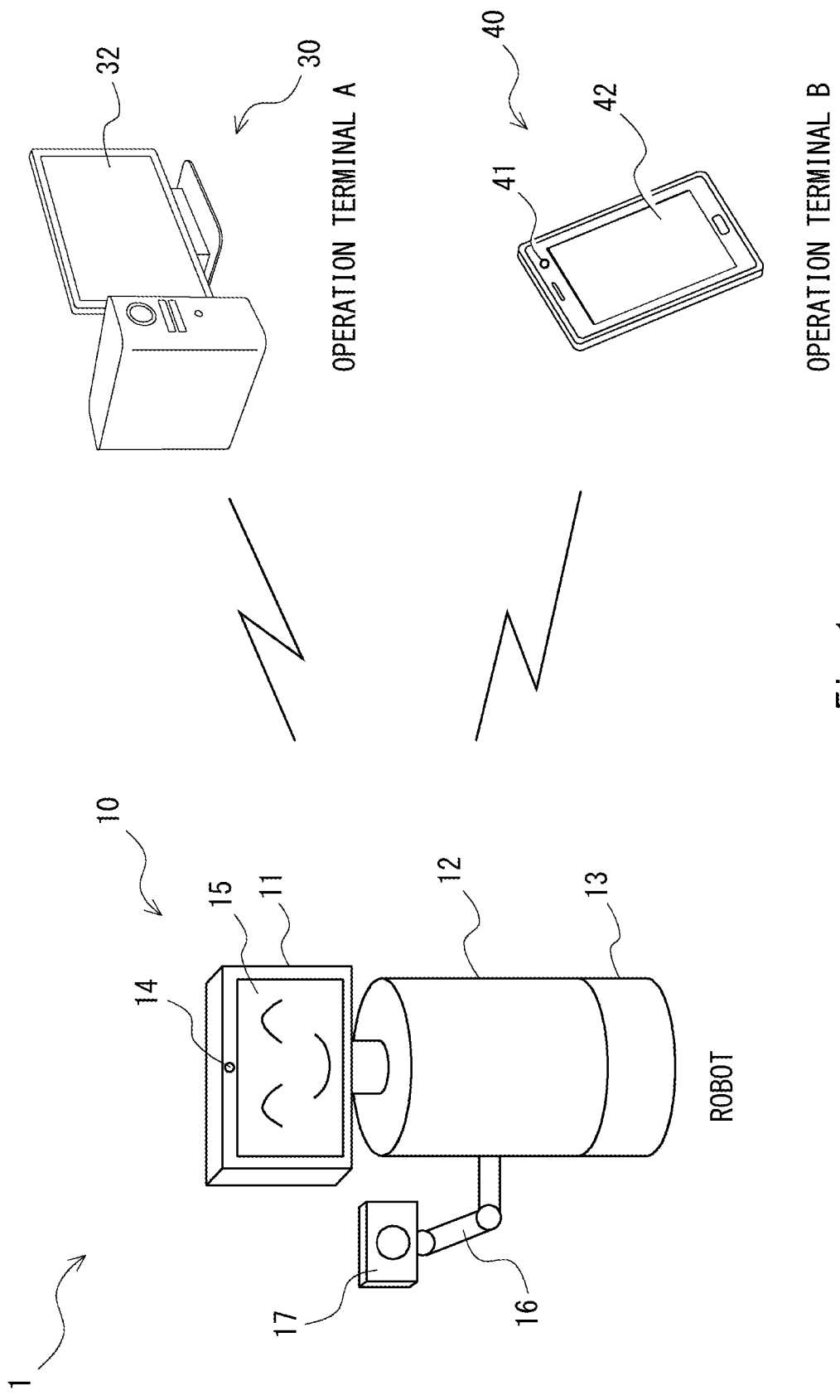
FIG. 1 is a diagram for explaining a robot system according to an embodiment.

FIG. 1 is a diagram for explaining a robot system according to the embodiment. As shown in FIG. 1, a robot system 1 according to this embodiment includes a robot 10 that performs a predetermined operation, an operation terminal A(30) for remotely operating the robot 10, and an operation terminal B(40) for remotely operating the robot 10, the operation terminal B(40) being provided separately from the operation terminal A(30).

For example, the robot system 1 according to this embodiment is a robot system enabling an operator (an operator who is operating the operation terminal B(40)) who is remotely operating the robot 10 to have an experience which simulates the scenery surrounding the robot 10 through the robot 10. Further, the robot system 1 according to this embodiment is a robot system in which persons who are away from each other can communicate in real time through the robot 10.

Specifically, the robot 10 is configured so that it can be remotely operated by using the operation terminal A(30) and the operation terminal B(40). The operation terminal A(30) is a main operation terminal for remotely operating the robot 10. For example, the operation terminal A(30) is an operation terminal for an administrator, and is an operation terminal capable of controlling the overall operation of the robot 10.

The operation terminal B(40) is a sub-operation terminal for remotely operating the robot 10. For example, the operation terminal B(40) is an operation terminal used by a person (an operator) who has an experience which simulates the scenery surrounding the robot 10 through the robot 10 or communicates with a person present near the robot 10 through the robot in real time, and is an operation terminal capable of controlling some of the operations of the robot 10. That is, the robot system 1 according to this embodiment is characterized in that an operation capable of being performed by the operation terminal B(40) to operate the robot 10 is restricted as compared with that performed by the operation terminal A(30). The configuration and the operation of the robot system 1 according to this embodiment will be described in detail below.

As shown in FIG. 1, the robot system 1 according to this embodiment includes the robot 10, the operation terminal A(30), and the operation terminal B(40). The robot 10 and the operation terminal A(30) are disposed at positions away from each other, and are configured so that they can wirelessly communicate with each other through a communication unit. Similarly, the robot 10 and the operation terminal B(40) are disposed at positions away from each other, and are configured so that they can wirelessly communicate with each other through the communication unit. Note that the operation terminal A(30) and the operation terminal B(40) may be disposed at positions away from each other or close to each other. Further, the operation terminal A(30) and the operation terminal B(40) may also be configured so that they can wirelessly communicate with each other. Further, the operation terminal A(30) and the operation terminal B(40) may be configured so that they can wirelessly communicate with each other through (by relaying) the robot 10.

<Configuration of Robot>

First, a configuration of the robot will be described. As shown in FIG. 1, the robot 10 includes a head part 11, a body 12, and a mobile unit 13. A camera A(14) and a display unit 15 are provided in the head part 11. The camera A(14) is a camera for photographing surroundings (mainly in the direction in which the robot 10 travels) of the robot 10. The camera A(14) is a camera used when the robot 10 is remotely operated by using the operation terminal A(30), and can be used for, for example, in a case in which the presence or absence of an obstacle is detected when the robot 10 moves and in a case in which a predetermined position that is a target destination of the robot 10 is searched for. Further, the camera A(14) may be used when an operator of the operation terminal B(40) communicates with a communication partner present near the robot 10 (a communication mode).

An image corresponding to the situation of the robot 10 is displayed on the display unit 15. For example, in a normal mode (other than the communication mode) in which, for example, the robot 10 moves, an image of a face of the robot 10 is displayed on the display unit 15. At this time, an image of an expression of the robot 10 showing its emotion (feelings) may be displayed on the display unit 15.

Figure 7:
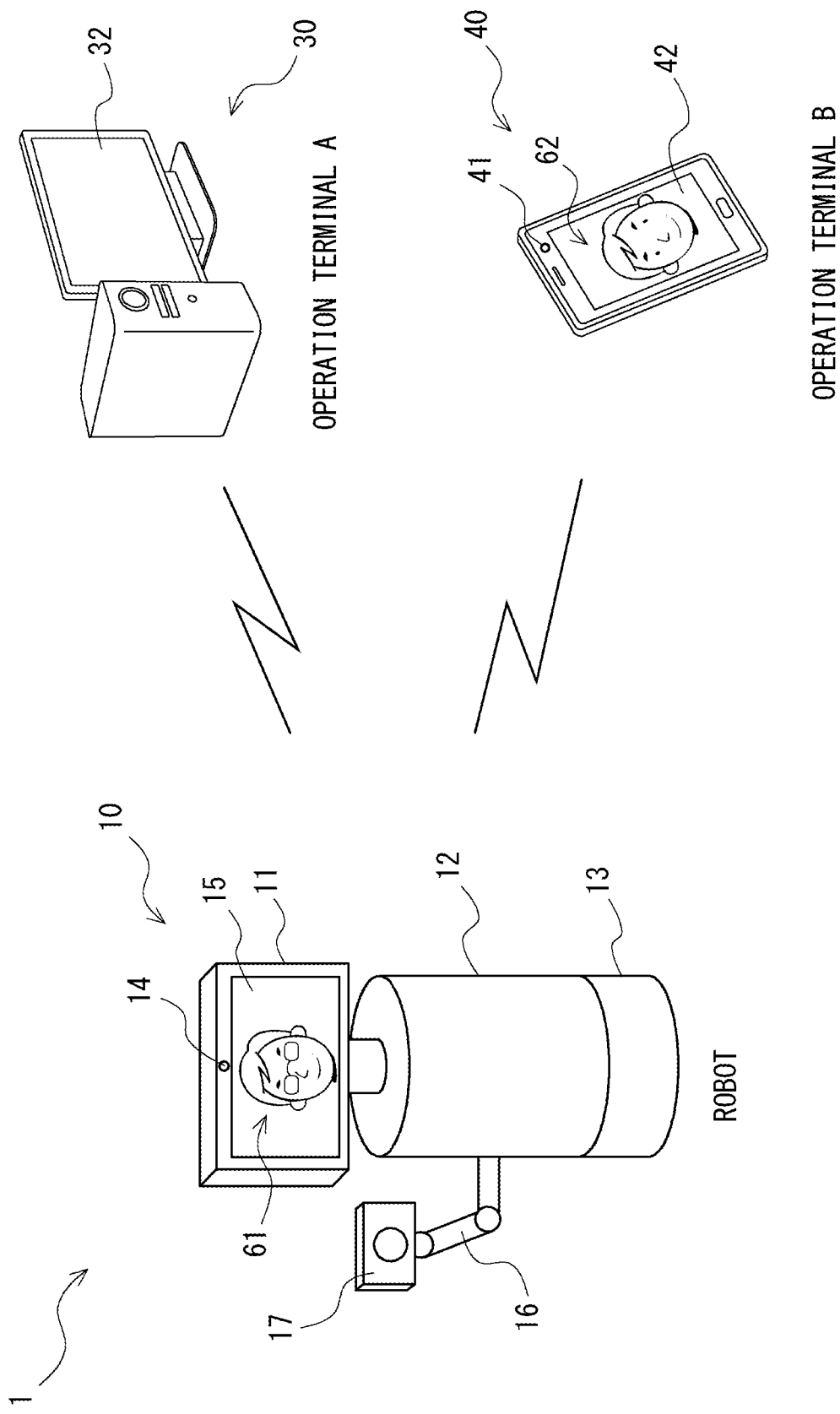
FIG. 7 is a diagram for explaining an operation example of the robot system according to the embodiment.

Further, in the communication mode in which an operator of the operation terminal B(40) communicates with a communication partner present near the robot 10 through the robot 10, an image of an operator 61 of the operation terminal B(40) is displayed on the display unit 15 (see FIG. 7).

An arm 16 is attached to the body 12. A camera B(17) is attached to the tip of the arm 16. The camera B(17) is a camera that can be operated by using the operation terminal B(40), and the operation terminal B(40) is configured so that it can operate at least one of a posture of the camera B(17) and a photographing condition (e.g., a magnification). Here, it is possible to adjust the posture of the camera B(17) by using the arm 16. That is, by operating the arm 16 using the operation terminal B(40), it is possible to control the posture of the camera B(17). Note that since the operation terminal A(30) can control the overall operation of the robot 10 as described above, the posture of the camera B(17) and the photographing condition (e.g., a magnification) can also be controlled by using the operation terminal A(30).

The mobile unit 13 is a unit for moving the robot 10. For example, wheels (not shown) are provided on the lower surface of the mobile unit 13, and the robot 10 can be moved by driving these wheels.

Figure 2:
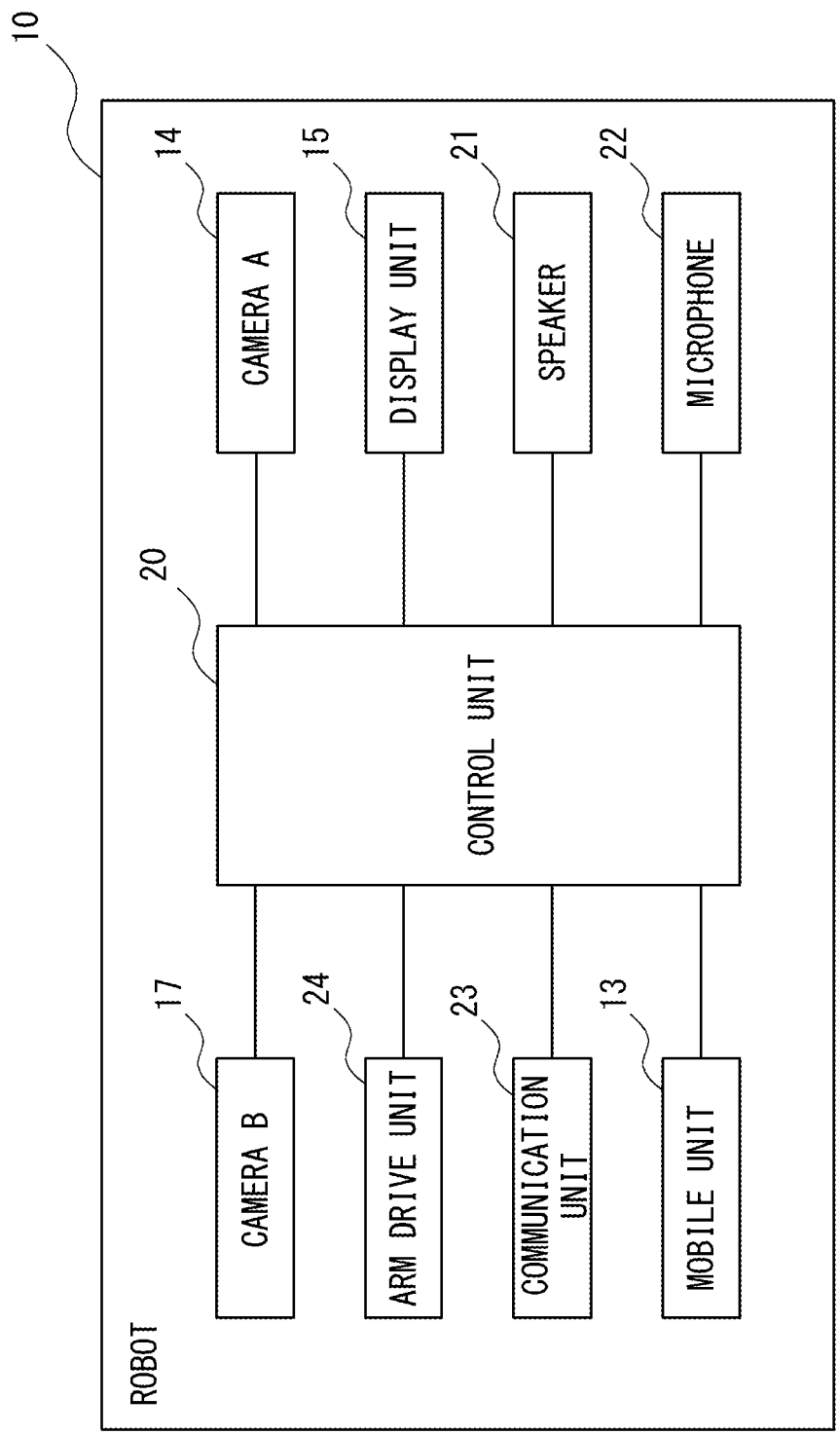
FIG. 2 is a block diagram for explaining a system configuration of a robot.

Next, a system configuration of the robot 10 will be described. FIG. 2 is a block diagram for explaining the system configuration of the robot. As shown in FIG. 2, the robot 10 includes a control unit 20 for controlling an operation of the robot 10. The mobile unit 13, the camera A(14), the display unit 15, the camera B(17), a speaker 21, a microphone 22, a communication unit 23, and an arm drive unit 24 are connected to the control unit 20.

The mobile unit 13 drives the wheels (not shown) of the mobile unit 13 based on a control signal supplied from the control unit 20. By doing so, it is possible to move the robot 10. For example, the control unit 20 can generate a control signal for controlling the mobile unit 13 based on an operation signal transmitted from the operation terminal A(30). Further, the control unit 20 may detect an obstacle present near the robot 10 by using information acquired from the camera A(14) or a laser scanner (not shown), and generate a control signal by using information about the detected obstacle. By doing so, it is possible to control the mobile unit 13 so that the robot 10 moves so as to avoid an obstacle.

The control unit 20 transmits image data acquired from the camera A(14) to the operation terminal A(30) through the communication unit 23. Further, the control unit 20 transmits image data acquired from the camera B(17) to the operation terminal B(40) through the communication unit 23.

The control unit 20 displays an image corresponding to the situation of the robot 10 on the display unit 15. For example, in the normal mode, the control unit 20 displays an image of a face of the robot on the display unit 15. At this time, the control unit 20 may display an image of an expression of the robot 10 showing its emotion (feelings) on the display unit 15.

Further, in the communication mode, the control unit 20 may display an image of the operator 61 (see FIG. 7) of the operation terminal B(40) on the display unit 15. That is, in the communication mode, the control unit 20 may display on the display unit 15 image data transmitted from the operation terminal B(40), that is, an image of the operator who is operating the operation terminal B(40).

Further, the control unit 20 may output voice data transmitted from the operation terminal B(40), that is, a voice of the operator who is operating the operation terminal B(40), from the speaker 21. Further, the control unit 20 may transmit voice data acquired by the microphone 22, that is, a voice of a communication partner present near the robot 10, to the operation terminal B(40) through the communication unit 23.

The arm drive unit 24 is used to drive the arm 16, and can be configured by using, for example, a motor. The arm drive unit 24 drives the arm drive unit 24 based on a control signal supplied from the control unit 20. By doing so, it is possible to displace the arm 16. For example, by displacing the arm 16, it is possible to adjust the position of the camera B(17).

The communication unit 23 is configured so that it can wirelessly communicate with the operation terminal A(30) and the operation terminal B(40). Note that the above configuration of the robot 10 is merely an example, and in the robot system 1 according to this embodiment, the configuration of the robot 10 is not limited to the above configuration.

<Configuration of Operation Terminal A(30)>

Next, the operation terminal A(30) will be described. As shown in FIG. 1, the operation terminal A(30) is a terminal for an administrator to remotely operate the robot 10, and can be configured, for example, by using a personal computer. Note that although FIG. 1 shows a case in which the operation terminal A(30) is configured by using a personal computer, the operation terminal A(30) may instead be configured by using a tablet terminal or the like.

Figure 3:
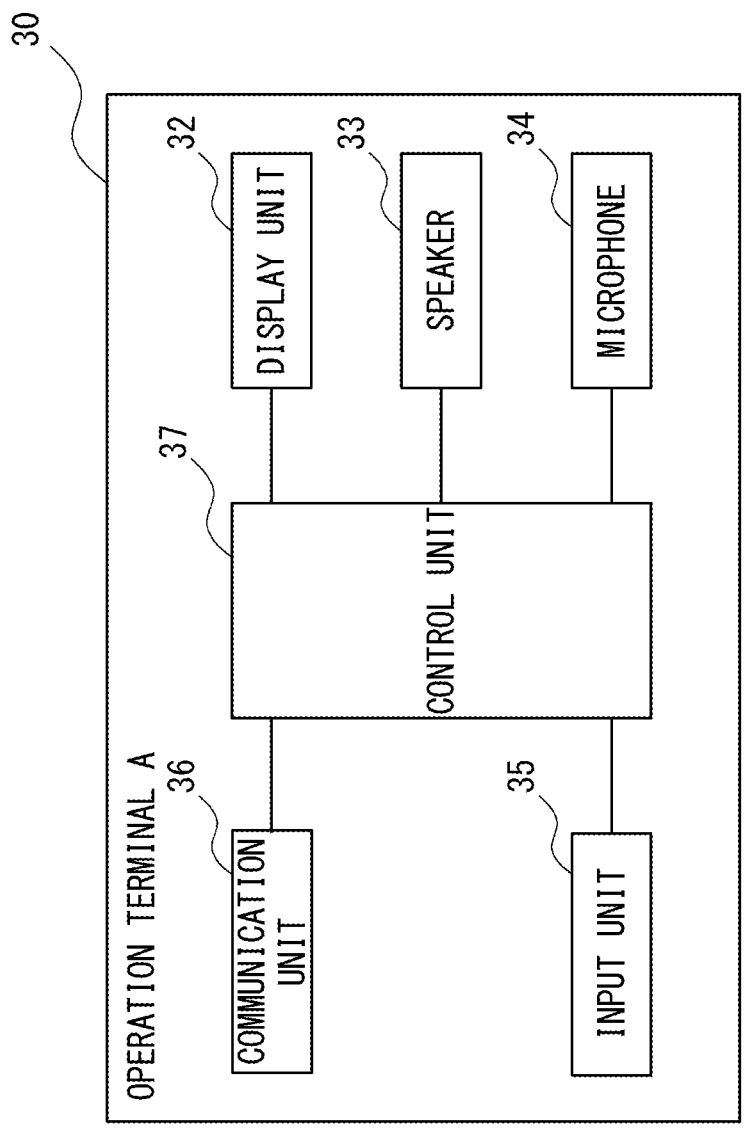
FIG. 3 is a block diagram for explaining a system configuration of an operation terminal A.

FIG. 3 is a block diagram for explaining a system configuration of the operation terminal A(30). As shown in FIG. 3, the operation terminal A(30) includes a display unit 32, a speaker 33, a microphone 34, an input unit 35, a communication unit 36, and a control unit 37. The control unit 37 has a function of controlling the operation terminal A(30), and the display unit 32, the speaker 33, the microphone 34, the input unit 35, and the communication unit 36 are connected to the control unit 37. The communication unit 36 is configured so that it can wirelessly communicate with the robot 10.

The control unit 37 displays image data transmitted from the robot 10, that is, an image photographed by the camera A(14) of the robot 10, on the display unit 32. The input unit 35 used by an administrator to input various types of information for remotely operating the robot 10. For example, the input unit 35 can be configured by using a touch panel or a keyboard. In a case in which the input unit 35 is configured by using a touch panel, for example, an administrator presses down (i.e., touches) an icon or the like displayed on the display unit 32, whereby it is possible to remotely operate the robot 10. Further, in a case in which the input unit 35 is configured by using a keyboard, for example, by inputting predetermined information from the keyboard, it is possible to remotely operate the robot 10.

Further, the control unit 37 outputs voice data transmitted from the robot 10, that is, a voice acquired by the microphone 22 of the robot 10, from the speaker 33. Further, the control unit 37 may transmit voice data acquired by the microphone 34, that is, a voice of an administrator who is operating the operation terminal A(30), to the robot 10 through the communication unit 36.

Note that the above configuration of the operation terminal A(30) is merely an example, and in the robot system 1 according to this embodiment, the configuration of the operation terminal A(30) is not limited to the above configuration.

<Configuration of Operation Terminal B(40)>

Next, the operation terminal B(40) will be described. As shown in FIG. 1, the operation terminal B(40) is a terminal for an operator (an operator who, for example, has a simulated experience) to remotely operate the robot 10, and can be configured by using, for example, a tablet terminal or the like. Note that although FIG. 1 shows a case in which the operation terminal B(40) is configured by using a tablet terminal, the operation terminal B(40) may instead be configured by using a personal computer or the like.

Figure 4:
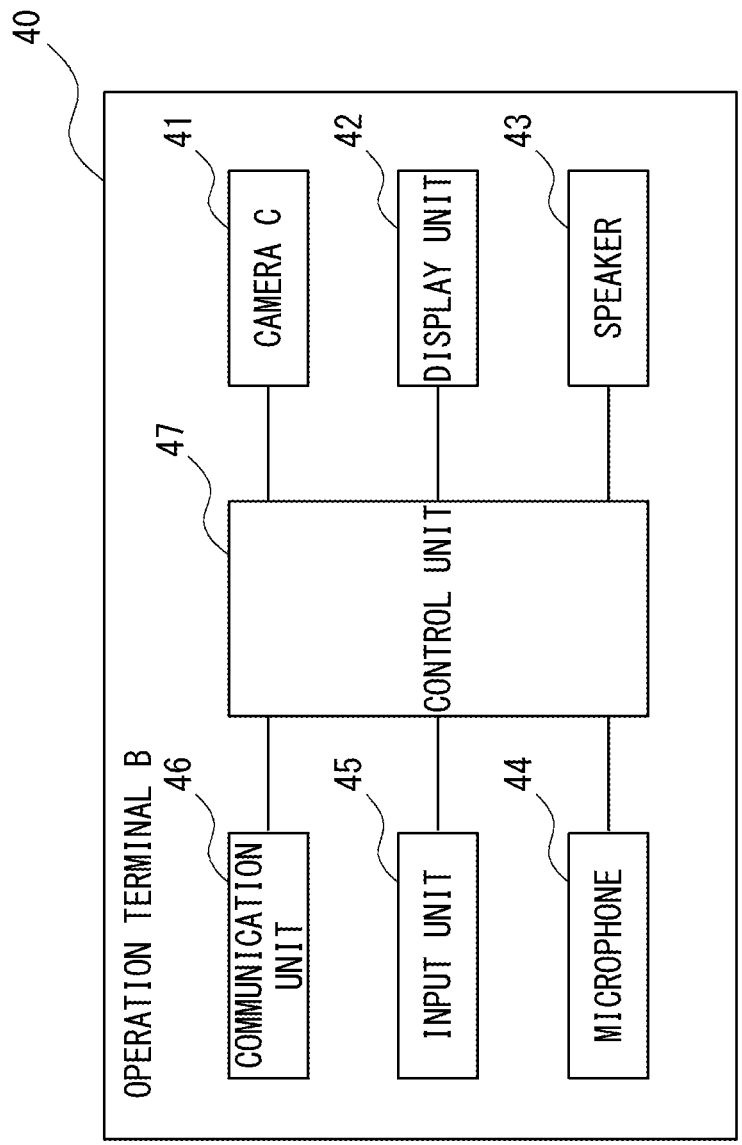
FIG. 4 is a block diagram for explaining a system configuration of an operation terminal B.

FIG. 4 is a block diagram for explaining a system configuration of the operation terminal B(40). As shown in FIG. 4, the operation terminal B(40) includes a camera C(41), a display unit 42, a speaker 43, a microphone 44, an input unit 45, a communication unit 46, and a control unit 47. The control unit 47 has a function of controlling the operation terminal B(40), and the camera C(41), the display unit 42, the speaker 43, the microphone 44, the input unit 45, and the communication unit 46 are connected to the control unit 47. The communication unit 46 is configured so that it can wirelessly communicate with the robot 10.

The input unit 45 is used to input various types of information for an operator to remotely operate the robot 10. For example, the input unit 45 can be configured by using a touch panel or a keyboard. In a case in which the input unit 45 is configured by using a touch panel, for example, an administrator presses down (i.e., touches) an icon or the like displayed on the display unit 42, whereby it is possible to remotely operate the robot 10.

In the robot system 1 according to this embodiment, an operation capable of being performed by the operation terminal B(40) to operate the robot 10 is restricted as compared with that performed by the operation terminal A(30). Specifically, the operation terminal B(40) is configured so that it can operate at least one of a posture of the camera B(17) of the robot 10 and a photographing condition. That is, by the operation terminal B(40) operating the arm 16 (the arm drive unit 24) of the robot 10, it is possible to control a posture of the camera B(17). Further, by the operation terminal B(40) operating the camera B(17) of the robot 10, it is possible to adjust a photographing condition (e.g., a magnification) of the camera. At this time, an image photographed by the camera B(17) is displayed on the display unit 42 of the operation terminal B(40).

For example, the robot system 1 according to this embodiment may be configured so that the robot 10 can be operated by using the operation terminal B(40) when the robot 10 reaches a predetermined position. Here, the predetermined position is, for example, a position where the safety of the robot 10 is ensured or a position where a photographing spot is located.

Further, in the robot system 1 according to this embodiment, when the robot 10 reaches a predetermined position, a guide display for guiding the direction of the camera B(17) of the robot 10 so that it faces the photographing spot corresponding to the predetermined position may be displayed on the display unit 42 of the operation terminal B(40). By displaying the guide on the display unit 42 in this way, it is possible to reduce the operation load on an operator.

Further, in the robot system 1 according to this embodiment, when the robot 10 reaches a predetermined position, a plurality of photographing spots corresponding to the predetermined position may be displayed so as to be selectable on the display unit 42 of the operation terminal B(40). Then, when a specific photographing spot is selected by using the operation terminal B(40), the camera B(17) of the robot 10 may be controlled so that the direction of the camera B(17) faces the selected photographing spot. When such a configuration is employed, it is possible to automatically make the direction of the camera B(17) face the specific photographing spot selected from a plurality of photographing spots, and thus it is possible to reduce the operation load on the operation terminal B(40).

Further, when an operator of the operation terminal B(40) communicates with a communication partner present near the robot 10 (in the case of the communication mode), the control unit 47 of the operation terminal B(40) may transmit image data acquired from the camera C(41) to the robot 10 through the communication unit 46. The image data transmitted to the robot 10 is displayed on the display unit 15 of the robot 10.

Further, in the communication mode, the control unit 47 may display the image data transmitted from the robot 10, that is, an image of the communication partner, on the display unit 42. Further, the control unit 47 may output voice data transmitted from the robot 10, that is, a voice of the communication partner standing in front of the robot 10, from the speaker 43. Further, the control unit 47 may transmit voice data acquired by the microphone 44, that is, a voice of the operator who is operating the operation terminal B(40), to the robot 10 through the communication unit 46. The voice data transmitted from the operation terminal B(40) is output from the speaker 21 of the robot 10.

Note that the above configuration of the operation terminal B(40) is merely an example, and in the robot system 1 according to this embodiment, the configuration of the operation terminal B(40) is not limited to the above configuration.

<Description of Operation of Robot System>

Next, an operation of the robot system according to this embodiment will be described.

Figure 5:
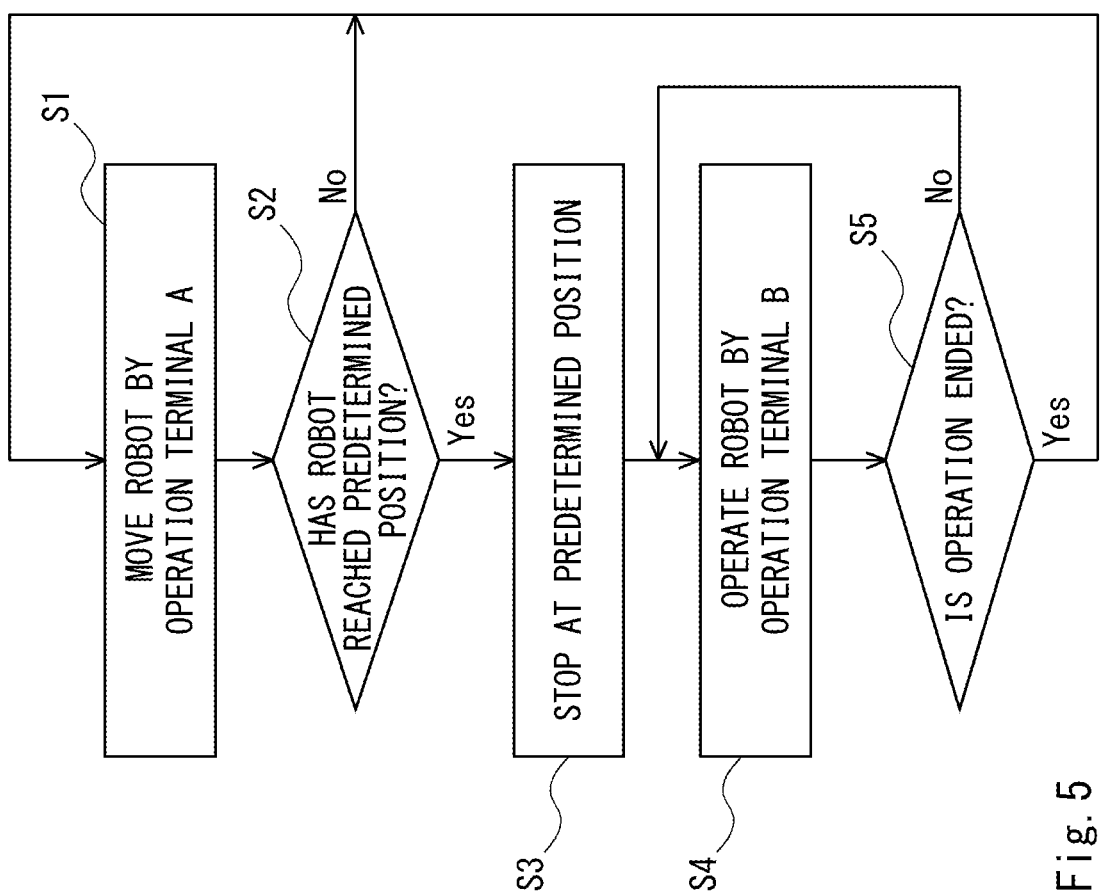
FIG. 5 is a flowchart for explaining an operation of the robot system according to the embodiment.
Figure 6:
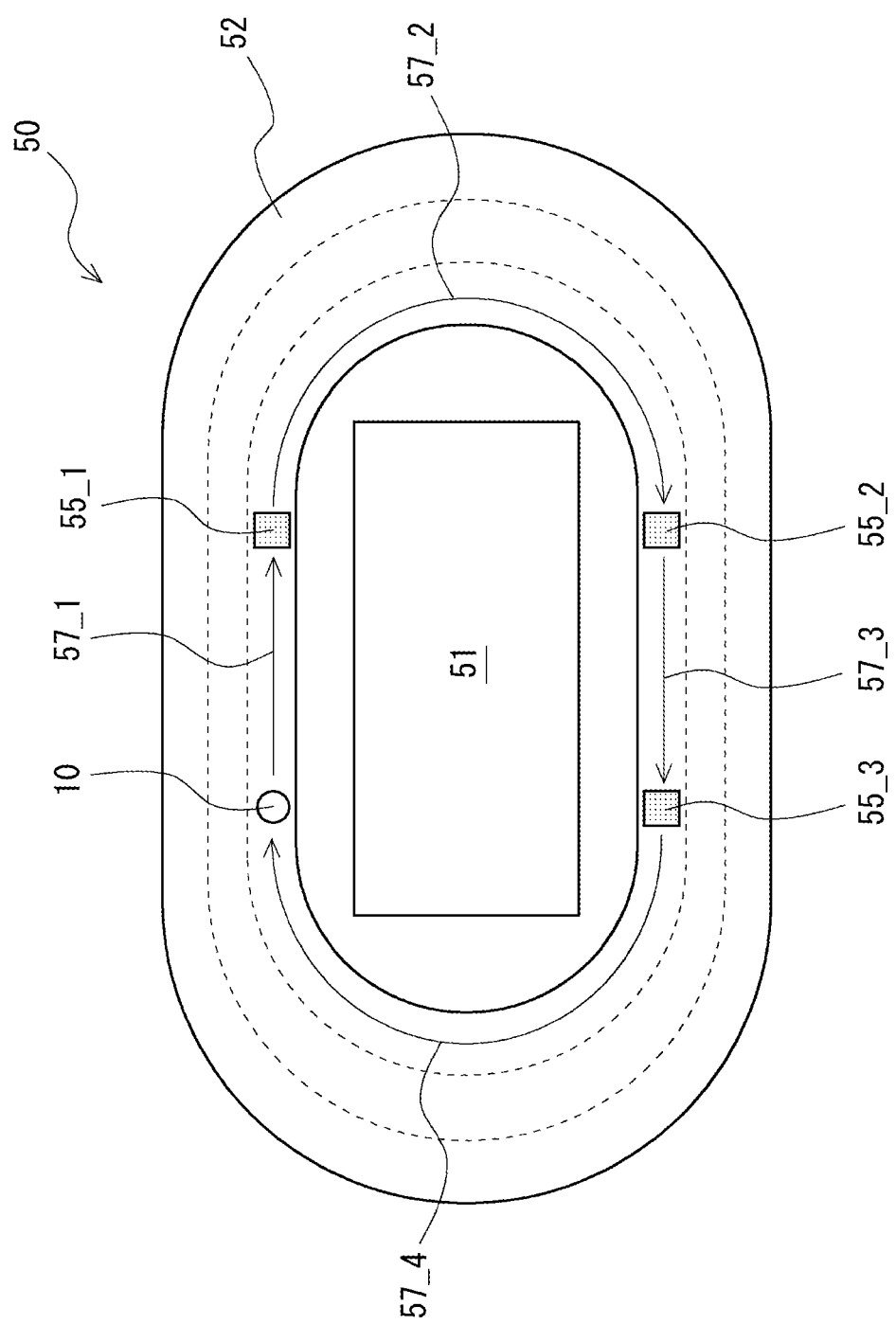
FIG. 6 is a diagram for explaining an operation example of the robot system according to the embodiment.

FIG. 5 is a flowchart for explaining the operation of the robot system according to this embodiment. FIG. 6 is a diagram for explaining an operation example of the robot system according to this embodiment. A description will be given below of an example in which the robot 10 goes around audience seats 52 of a stadium 50 shown in FIG. 6, and an operator of the operation terminal B(40) at a remote place has an experience which simulates the scenery surrounding the robot 10 through the robot 10.

As shown in FIG. 6, a field 51 is provided in the center of the stadium 50, and the audience seats 52 are provided around the field 51. The robot 10 moves along a row of the audience seats 52 located around the field 51 on predetermined routes 57_1 to 57_4. Further, a plurality of predetermined positions 55_1 to 55_3 are provided in the predetermined routes 57_1 to 57_4. Here, the predetermined position is, for example, a photographing spot suitable for photographing of a game being played in the field 51 and a position suitable for communication with audiences watching the game and players.

As shown in the flowchart of FIG. 5, first, an administrator operates the operation terminal A(30) to move the robot 10 (Step S1). As shown in FIG. 6, the robot 10 moves along a row of the audience seats 52 on the route 57_1. For example, the administrator may move the robot 10 by a manual operation using the operation terminal A(30). In this case, the administrator operates the robot 10 while checking the image photographed by the camera A(14) of the robot 10. Further, for example, a program (a scenario) for moving the robot 10 along the predetermined routes 57_1 to 57_4 may be stored in the robot 10, and the robot 10 may be automatically moved by executing this program (this scenario) using the operation terminal A(30).

The movement of the robot 10 is continued until the robot 10 reaches the predetermined position 55_1 (Step S2: No). Then, when the robot 10 reaches the predetermined position 55_1 (Step S2: Yes), the robot 10 stops at the predetermined position 55_1 (Step S3).

After that, an operator at a remote place operates the robot 10 by using the operation terminal B(40) (Step S4). For example, the operator operates the operation terminal B(40) to operate (i.e., control) at least one of a posture of the camera B(17) of the robot 10 and a photographing condition. At this time, since an image photographed by the camera B(17) is displayed on the display unit 42 of the operation terminal B(40), the operator at a remote place can have an experience which simulates the scenery surrounding the robot 10 through the robot 10.

Further, for example, a guide display for guiding the direction of the camera B(17) of the robot 10 so that it faces the photographing spot corresponding to the predetermined position 55_1 may be displayed on the display unit 42 of the operation terminal B(40). By displaying a guide on the display unit 42 in this way, it is possible to reduce the operation load on an operator. Here, the photographing spot corresponding to the predetermined position 55_1 is a highlight spot (e.g., a spot near the finish line of a track event) that can be seen from the predetermined position 55_1.

Further, a plurality of photographing spots corresponding to the predetermined position 55_1 may be displayed so as to be selectable on the display unit 42 of the operation terminal B(40). Then, when the operator selects a specific photographing spot from among the plurality of photographing spots by using the operation terminal B(40), the direction of the camera B(17) of the robot 10 may be made to face the selected photographing spot. When such a configuration is employed, it is possible to automatically make the direction of the camera B(17) face a specific photographing spot selected from a plurality of photographing spots, and thus it is possible to reduce the operation load on the operation terminal B(40).

Further, in this embodiment, an operator at a remote place can communicate with persons (audiences watching a game and players) present near the robot 10 in real time through the robot 10 (the communication mode). Specifically, as shown in FIG. 7, an operator who is operating the operation terminal B(40) can communicate with a communication partner present near the robot 10. In this case, it is possible to perform the communication by using at least one of the camera A(14) and the camera B(17) mounted on the robot 10 and the camera C(41) mounted on the operation terminal B(40) while the operator and the communication partner are looking at each other's faces.

That is, the communication partner present near the robot 10 is photographed by the camera A(14) (may instead be the camera B(17)) of the robot 10. Then the photograph of the communication partner 62 is displayed on the display unit 42 of the operation terminal B(40) of the operator. Similarly, the operator who is operating the operation terminal B(40) is photographed by the camera C(41) of the operation terminal B(40). Then the photograph of the operator 61 is displayed on the display unit 15 of the robot 10. Further, a microphone and a speaker are mounted on the robot 10 and another microphone and another speaker are mounted on the operation terminal B(40). Therefore, the communication partner 62 and the operator 61 can communicate by talking while looking at each other's faces. In this way, an operator at a remote place can communicate with audiences watching a game and players through the robot 10.

The operation of Step S4 described above is continued until the operator ends the operation of the operation terminal B(40) (Step S5: No).

After that, when the operation of the operation terminal B(40) by the operator is ended (Step S5: Yes), the administrator operates the operation terminal A(30) to move the robot 10 along the route 57_2 (Step S1). After that, when the robot 10 reaches the predetermined position 55_2 (Step S2: Yes), the robot 10 stops at the predetermined position 55_2 (Step S3). Then, the operator at a remote place operates the robot 10 by using the operation terminal B(40) (Step S4). After that, operations similar to the above operations are repeated.

As described above, in the robot system 1 according to this embodiment, an operation capable of being performed by the operation terminal B(40) to operate the robot 10 is restricted as compared with that performed by the operation terminal A(30). That is, since an operator who, for example, has a simulated experience only temporarily operates the operation terminal B(40), the operator is often unfamiliar with the operation of the operation terminal B(40). Thus, by restricting the operation capable of being performed by the operation terminal B(40) to operate the robot 10, even if the operator of the operation terminal B(40) erroneously operates the operation terminal B(40), the operation of the robot 10 is restricted and therefore the safety of the robot 10 can be ensured. Therefore, it is possible to provide a robot system capable of ensuring safety when an operator remotely operates the robot. Note that since the operation terminal A(30) is operated by an administrator who is familiar with the operation thereof, it is configured so that it can control the overall operation of the robot 10.

Note that the present disclosure is not limited to the above-described embodiment and may be modified as appropriate without departing from the spirit of the present disclosure. For example, in the above configuration example, the case in which an operator operates the camera B(17) of the robot 10 by using the operation terminal B(40) has been described. However, in this embodiment, an operator may be able to operate the camera A(14) of the robot 10. In this case, like in the above case, an operator can operate the camera A(14) of the robot 10 at a predetermined position where safety is ensured. Further, the neck part of the robot 10 connecting the head part 11 of the robot 10 to the body 12 thereof may be displaceable. With such a structure, an operator can displace the position of the camera A(14) by using the operation terminal B(40).

Further, in the above description, the case in which the operation of the camera B(17) of the robot 10 is restricted while the robot 10 is moving has been described. However, an operator may be able to operate the camera B(17) of the robot 10 by using the operation terminal B(40) if safety can be ensured. For example, if safety can be secured by restricting the movable range of the arm 16 of the robot 10, an operator may be able to operate the camera B(17) of the robot 10 by using the operation terminal B(40). In this case, when the robot 10 reaches a predetermined position (a position where safety is ensured), the restriction of the movable range of the arm 16 may be released.

Further, although the present disclosure has been described as a hardware configuration in the above embodiment, the present disclosure is not limited thereto. In the present disclosure, processing for controlling the robot system can be implemented by causing a Central Processing Unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for controlling a robot system, the method comprising:
   performing, by a robot, a predetermined operation;
   remotely operating, by a first operation terminal, the robot; and
   remotely operating, by a second operation terminal, a camera attached to the robot, the second operation terminal being provided separately from the first operation terminal,
   restricting a range of motion of the camera capable of being performed using the second terminal before the robot reaches a predetermined position, and
   not restricting the range of motion of the camera capable of being performed by the second terminal after the robot reaches the predetermined position.

2. A non-transitory computer readable medium storing a program for causing a computer to execute processing for controlling a robot system to perform:
   performing, by a robot, a predetermined operation;
   remotely operating, by a first operation terminal, the robot; and
   remotely operating, by a second operation terminal, a camera attached to the robot, the second operation terminal being provided separately from the first operation terminal,
   restricting a range of motion of the camera capable of being performed using the second terminal before the robot reaches a predetermined position, and
   not restricting the range of motion of the camera capable of being performed by the second terminal after the robot reaches the predetermined position.

3. A robot system comprising:
   a robot configured to perform a predetermined operation;
   a first operation terminal configured to remotely operate the robot; and
   a second operation terminal configured to remotely operate a camera attached to the robot, the second operation terminal being provided separately from the first operation terminal,
   wherein a range of motion of the camera capable of being performed by the second terminal is restricted before the robot reaches a predetermined position, and;

the range of motion of the camera capable of being performed by the second terminal is not restricted after the robot reaches the predetermined position.

4. The robot system according to claim 3, wherein the robot is configured to be movable along a predetermined route, a first user moves the robot along the route by using the first operation terminal, and a second user remotely operates the camera by using the second operation terminal when the robot reaches the predetermined position.

5. The robot system according to claim 3, wherein the second operation terminal is configured to be able to operate at least one of a posture of the camera and a photographing condition.

6. The robot system according to claim 5, wherein when the robot reaches the predetermined position, a guide display for guiding a direction of the camera so that it faces a photographing spot corresponding to the predetermined position is displayed on a display unit of the second operation terminal.

7. The robot system according to claim 5, wherein when the robot reaches the predetermined position, a plurality of photographing spots corresponding to the predetermined position are displayed so as to be selectable on a display unit of the second operation terminal, and when a specific photographing spot is selected by using the second operation terminal, the camera is controlled so that the direction of the camera faces the selected photographing spot.

8. The robot system according to claim 3, wherein a second camera is further provided in the second operation terminal, and when the robot reaches the predetermined position, the second user who is operating the second operation terminal communicates with a communication partner present near the robot by using the second camera.

* * * * *